United States Patent [19]
Nolan et al.

[11] Patent Number: 5,735,532
[45] Date of Patent: *Apr. 7, 1998

[54] SEAL COMPRESSION LIMITING RETAINER

[75] Inventors: Terence J. Nolan; Jeffrey E. Swensen, both of Eldersburg; J. Loyd Spence, Elkridge, all of Md.

[73] Assignee: EG&G Pressure Science, Inc., Beltsville, Md.

[*] Notice: The term of this patent shall not extend beyond the expiration date of Pat. No. 5,713,582.

[21] Appl. No.: 778,631

[22] Filed: Jan. 3, 1997

[51] Int. Cl.⁶ .................................................. F16J 15/06
[52] U.S. Cl. ........................................ 277/630; 277/639
[58] Field of Search ............................. 277/1, 9, 11, 180, 277/181, 183, 189, 235 B

[56] References Cited

U.S. PATENT DOCUMENTS

| | | | |
|---|---|---|---|
| 2,339,478 | 1/1944 | Hoheisel | 277/180 |
| 2,795,444 | 6/1957 | Nenzell | 277/180 |
| 3,499,655 | 3/1970 | Czernik et al. | 277/235 B |
| 3,578,346 | 5/1971 | Jelinek | 277/180 |
| 3,857,572 | 12/1974 | Taylor et al. | 277/9.5 |
| 3,871,668 | 3/1975 | Coker et al. | 277/180 |
| 4,114,906 | 9/1978 | Jelinek | 277/180 |
| 4,348,032 | 9/1982 | Hanson et al. | 277/235 B |
| 4,648,607 | 3/1987 | Yamada | 277/9 |
| 4,813,691 | 3/1989 | Schoenborn | 277/235 B |
| 5,011,162 | 4/1991 | Jelinek | 277/11 |
| 5,145,190 | 9/1992 | Boardman | 277/235 B |
| 5,364,109 | 11/1994 | Sihon | 277/9 |
| 5,375,851 | 12/1994 | Mockenhaupt | 277/9 |
| 5,518,257 | 5/1996 | Breaker | 277/180 |
| 5,529,313 | 6/1996 | Malks | 277/11 |
| 5,564,714 | 10/1996 | Katsuno et al. | 277/181 |
| 5,580,065 | 12/1996 | Ueta | 277/180 |

OTHER PUBLICATIONS

Pressure Science Incorporated Catalog—"Tayor's Resilient Metallic Seals"—1981—pp. 2.6 and 23.

*Primary Examiner*—Scott Cummings
*Attorney, Agent, or Firm*—Roylance,Abrams,Berdo & Goodman, L.L.P.

[57] ABSTRACT

A sealing assembly is disclosed for creating a seal between first and second mating members or components. The sealing assembly basically includes a seal retainer with one or more annular seals coupled thereto. The seal retainer includes a body portion constructed of three layers. The inner layer is designed to retain the seal or seals thereto, while the outer layers or plates are designed to limit the amount of seal compression. The inner layer has at least one resilient retaining element integrally formed therewith as a one-piece, unitary member for engaging and retaining the seal or seals to retain the seal or seals thereto.

39 Claims, 5 Drawing Sheets

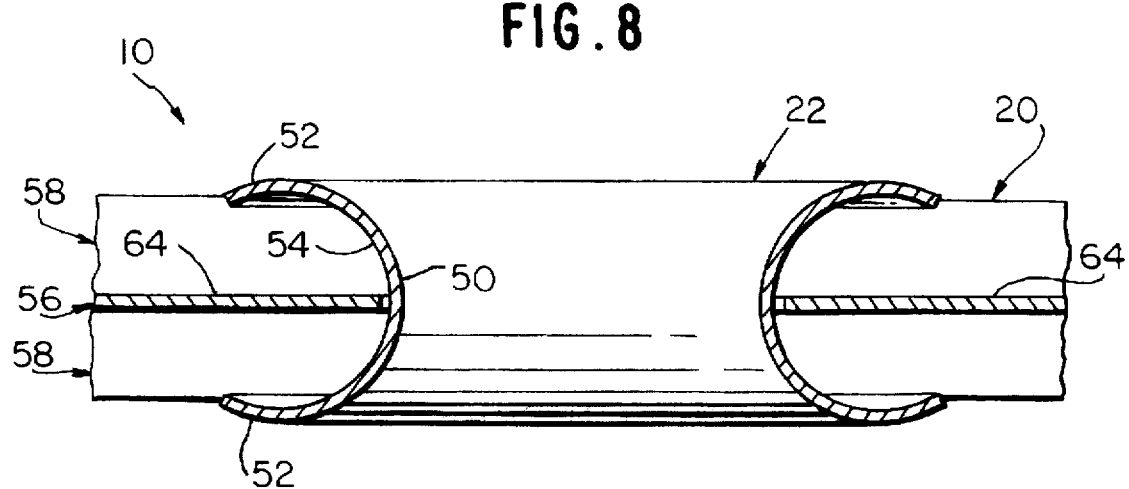
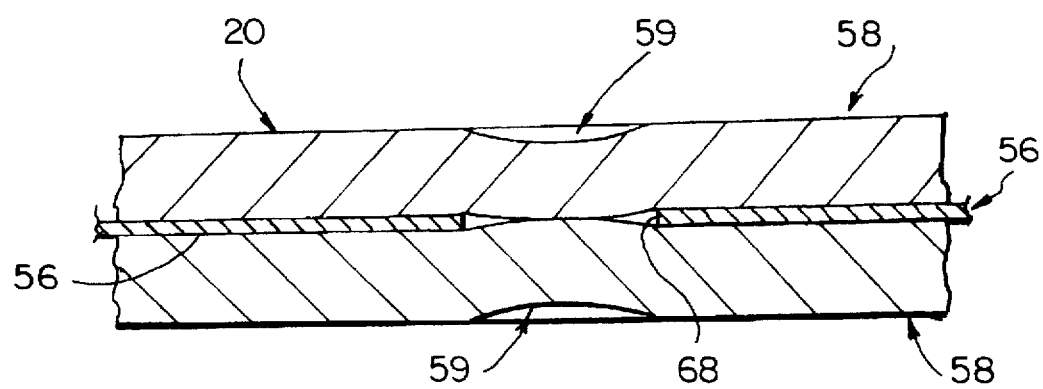

SEAL COMPRESSION LIMITING RETAINER

FIELD OF THE INVENTION

The present invention generally relates to a seal retainer which holds one or more seals. More specifically, the present invention relates to a seal retainer with integrally formed retaining elements for retaining and positioning one or more seals between a pair of members or components with the orifice(s), port(s) or counterbore(s) to be sealed.

BACKGROUND OF THE INVENTION

Seals of various types and shapes have been employed to prevent fluid from escaping from a Joint along a fluid flow path or in a fluid receptacle. Joints in the flow path or in a container are of course formed whenever two or more members or components are brought together to form a continuous conduit or a fluid receptacle. One common type of seal is a ring seal which is employed between members or components along the flow path, thus, preventing fluid from escaping between the two members. These two members or components often have grooves or counterbores formed therein to receive the ring seal and to form a seal gland.

These ring seals are resilient due to their material and their geometric shape so that the ring seal fills the gap between the adjacent members or components defining the flow path. The desired result is that the ring seal will firmly abut both members or components at all points along the seal so that the gap is completely blocked by the ring seal.

These ring seals can be installed in a variety of ways between the pair of members. The most common method is to merely place the ring seal in the groove or counterbore which forms the seal gland. However, in this method, the seal often moves or shifts during assembly of the two parts. Moreover, it is often difficult in certain applications to assemble the two parts together without the seal falling out of position. This causes the seal to be contaminated or damaged during installation.

It is also known that it is possible to use retainer plates for holding a seal in place to assist in the assembly. One example of a retainer plate is disclosed in U.S. Pat. No. 3,857,572 to Taylor et al. As seen in FIGS. 3 and 4 of the Taylor et al. patent, the ring seals are retained in openings of the retainer plate by a split wire ring which fits in a groove of the retainer plate and engages the outer surface of the ring seal. Also, the retainer plate of the Taylor et al. patent has holes for receiving bolts to secure the retainer plate to the members or components being coupled together.

While the retainer plate of the Taylor et al. patent is useful in certain applications, it may require special tooling to be used in certain circumstances. In particular, the retainer plate of the Taylor et al. patent is designed to be used with a pair of members or components which do not include a counterbore or groove for receiving the ring seal. Rather, the retainer plate of the Taylor et al. patent must have a thickness which permits the proper amount of inward deflection of the ring seal to insure proper sealing. Moreover, the retainer plate of the Taylor et al. patent is a multi-part retainer plate which can be more costly to manufacture.

Retainer plates are also known which, to retain the ring seals in place, utilize a friction type fit. For example, a retainer plate could be provided with a circular opening and the ring seal could be made slightly elliptical such that the ring seal is elastically deformed during insertion of the seal into the circular opening. One drawback of this type of retainer plate and seal assembly is that the ring seal typically must have a large diameter such that the elliptical shape can be easily deformed for insertion into the round opening of the retainer plate. Another drawback of this type of retainer plate and seal assembly is that it requires deformation of the seal which can result in the seal being contaminated or damaged during installation. Moreover, this type of retainer plate typically requires a substantially rigid plate with a substantial thickness such that the seal cannot be used with mating members or components having counterbores.

In view of the above, it is apparent to those skilled in the art that there exists a need in the art for a seal retainer which can be used with a pair of mating members or components with at least one of the members or components having a counterbore for receiving the ring seal. Moreover, there exists a need for an inexpensive seal retainer which can be relatively easily manufactured and installed. Also, there further exists a need for a seal retainer which permits seals to be installed between a pair of mating members or components without contact by hands or tools which could contaminate or damage the seal or seals. This invention addresses these needs in the art, as well as other needs which will become apparent to those skilled in the art once given this disclosure.

SUMMARY OF THE INVENTION

One object of the present invention is to provide a seal retainer which can be utilized with one or more highly reliable metallic seals to locate and retain the seal or seals with respect to orifice(s), port(s), or counterbore(s) to be sealed.

Another object of the present invention is to provide a seal retainer which can be used with one or more seals to retain the seal retainer to one of the mating members or components prior to coupling of the mating members or components together to prevent loss of the seal or seals in difficult assembly orientations.

Another object of the present invention is to provide a seal retainer which provides the installer with control of the seal or seals in inverted or vertical assembly situations.

Still another object of the present invention is to provide a seal retainer whereby the seal or seals can be installed without contact by hands or tools between the pair of mating members or components to avoid contamination or damage to the seal or seals.

Yet another object of the present invention is to provide a seal retainer that is relatively inexpensive to manufacture.

Another object of the present invention is to provide a seal retainer which is relatively easy to install.

The foregoing objects are basically attained by providing a seal retainer for coupling at least one seal thereto, comprising a substantially flat inner layer lying in a first plane with a first thickness, the inner layer including at least one seal receiving aperture, and at least one resilient retaining element integrally formed with the inner layer as a one-piece, unitary member, the at least one retaining element extending inwardly from the inner layer into the at least one seal receiving aperture to a free end; and a first outer plate with a second thickness fixedly coupled to and overlying a portion of a first side of the inner layer to increase overall thickness of the seal retainer. The foregoing objects can further be attained by a sealing assembly for creating a seal between first and second components, comprising at least one annular seal with first and second longitudinally facing sealing surfaces and an outwardly facing cavity located between the first and second longitudinally facing sealing surfaces; and a seal retainer having a substantially flat inner layer lying in a first plane with a first thickness, and a first outer plate with a second thickness fixedly coupled to and overlying a portion of a first side of the inner layer, the inner layer including at least one seal receiving aperture, and at least one resilient retaining element integrally formed with the inner layer for engaging the cavity of the at least one seal to retain the at least one seal thereto.

Other objects, advantages and salient features of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 8 is a partial, enlarged transverse cross sectional view of the seal retainer and one of the ring seals coupled thereto as illustrated in FIGS. 1-7 and taken along section line 8—8 of FIG. 6; and FIG. 9 is a partial enlarged transverse cross-sectional view of the seal retainer illustrated in FIGS. 1-8, taken along section line 9—9 of FIG. 6.

DETAILED DESCRIPTION OF THE PREFERRED EMBODIMENT

Figure 1:
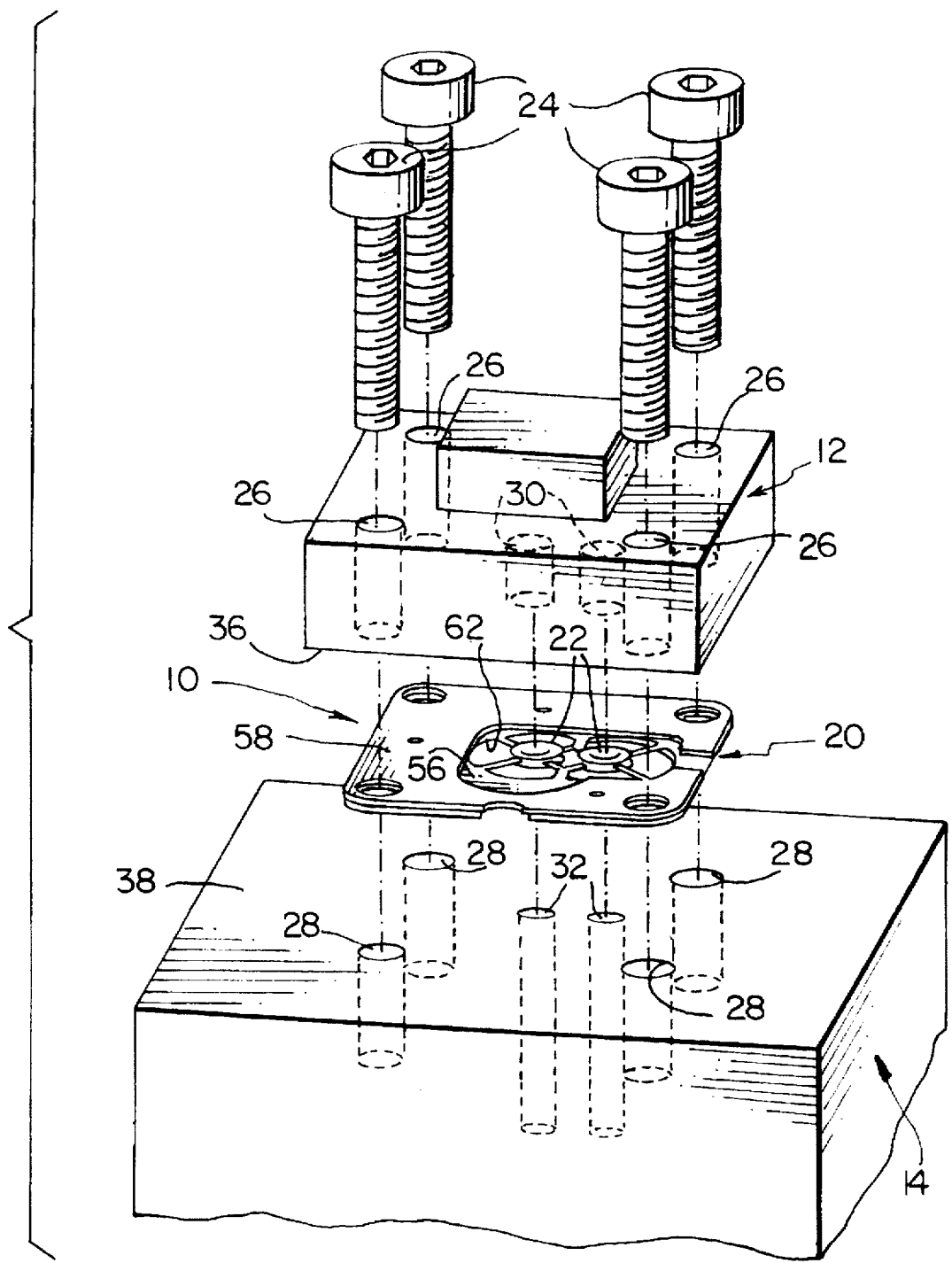
FIG. 1 is a partial exploded perspective view of a sealing assembly with a pair of C-shaped ring seals coupled to a seal retainer, in accordance with the present invention, which is to be compressed between a pair of mating members or components to create a seal therebetween.
Figure 2:
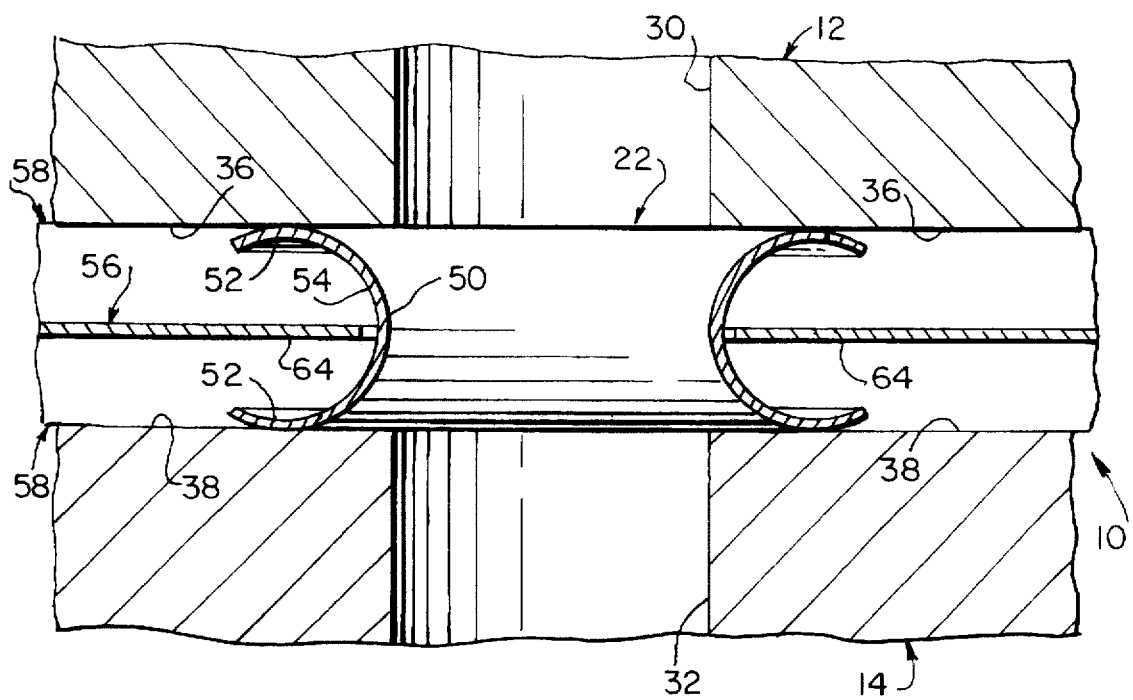
FIG. 2 is a partial, enlarged cross sectional view of sealing assembly illustrated in FIG. 1 after being coupled to the pair of mating members or components in accordance with the present invention.
Figure 3:
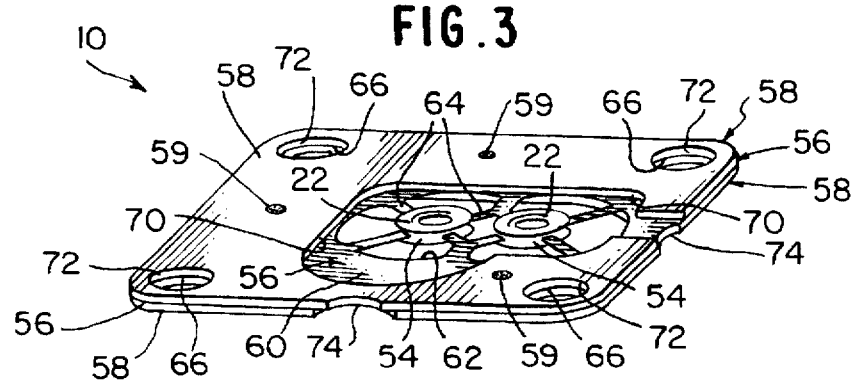
FIG. 3 is a perspective view of the seal retainer illustrated in FIGS. 1 and 2 in accordance with the present invention, with the ring seals coupled thereto.
Figure 4:
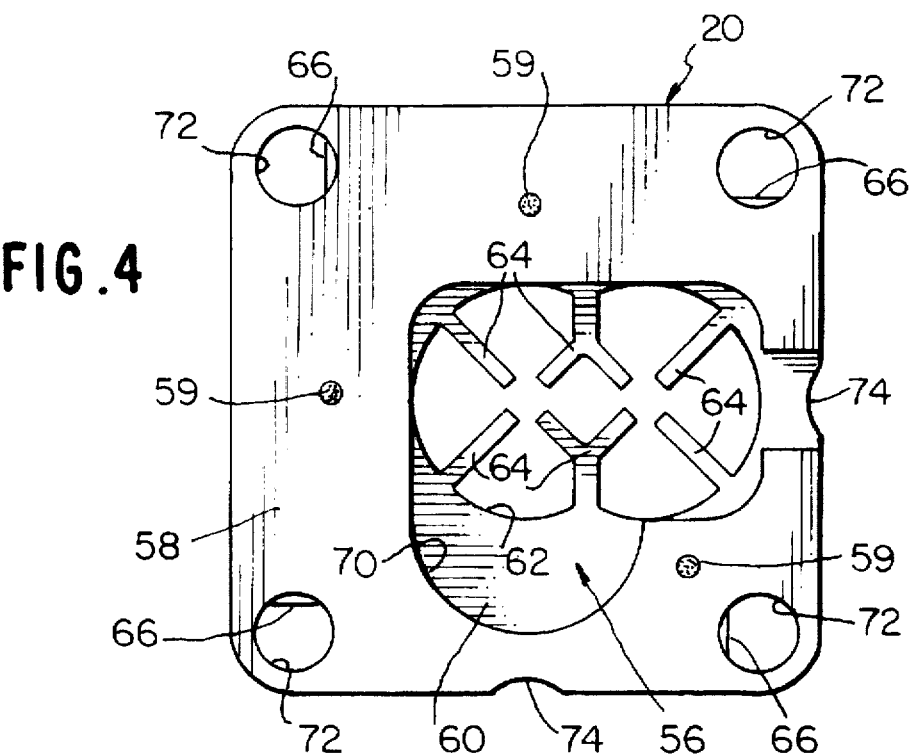
FIG. 4 is a top plan view of the seal retainer illustrated in FIGS. 1-3 in accordance with the present invention, without the ring seals coupled thereto.
Figure 5:
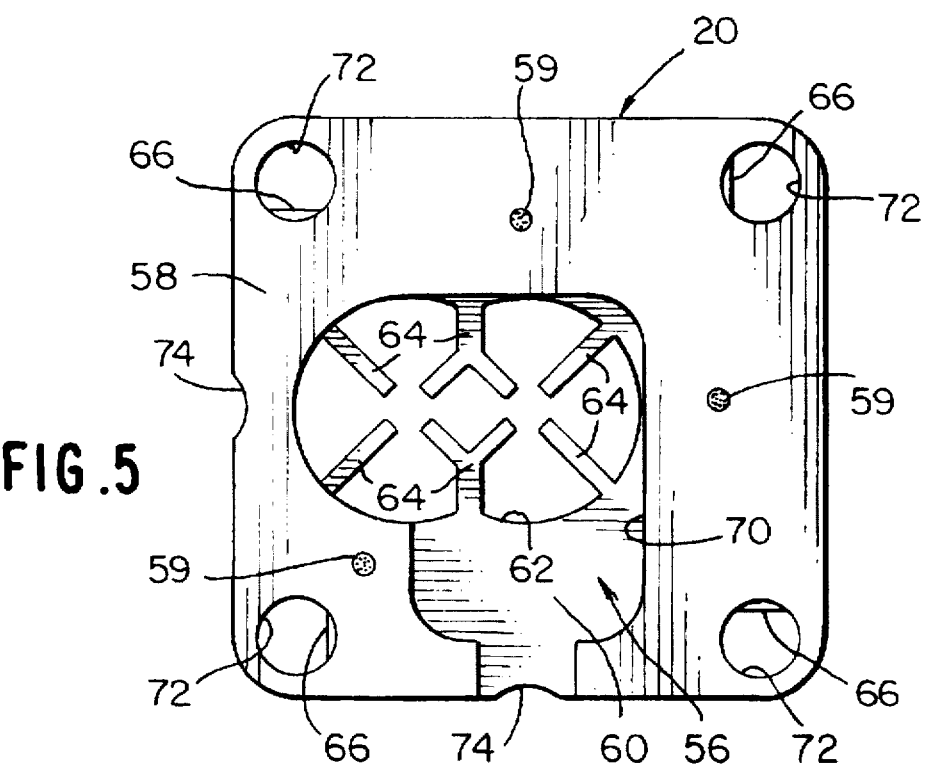
FIG. 5 is a bottom plan view of the seal retainer illustrated in FIGS. 1-4 in accordance with the present invention, without the ring seals coupled thereto.
Figure 6:
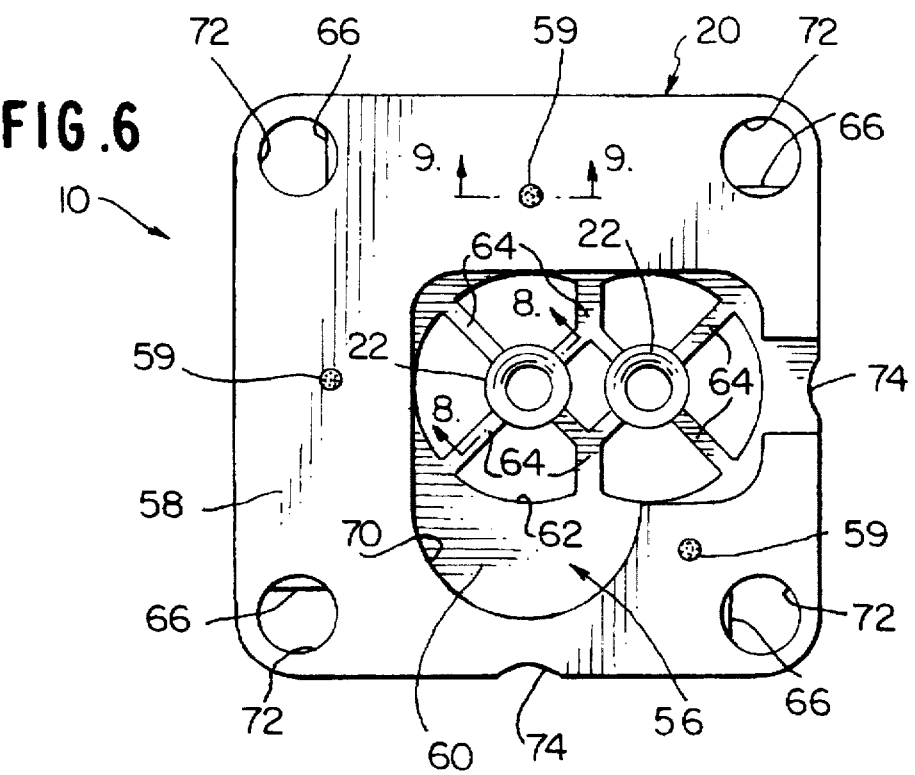
FIG. 6 is a top plan view of the seal retainer illustrated in FIGS. 1-5 in accordance with the present invention, with a pair of ring seals coupled thereto.
Figure 7:
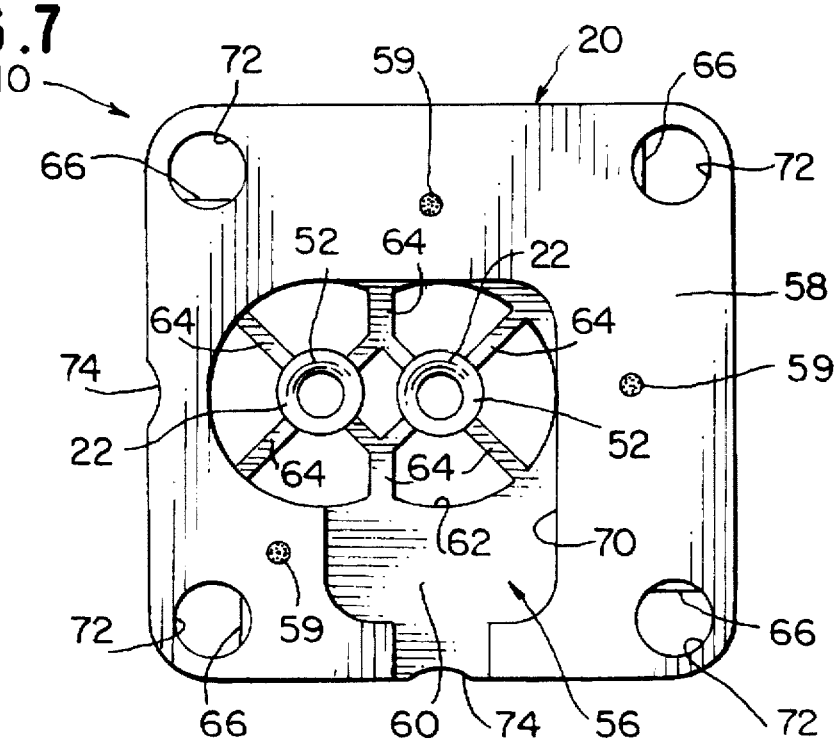
FIG. 7 is a bottom plan view of the seal retainer illustrated in FIGS. 1-4 in accordance with the present invention, with the ring seals coupled thereto.

Referring initially to FIGS. 1 and 2, a sealing assembly 10 in accordance with a first embodiment of the present invention is illustrated prior to being coupled between a pair of mating members or components 12 and 14. Sealing assembly 10 basically includes a seal retainer 20 and a pair of seals 22 coupled to seal retainer 20. Sealing assembly 10 is particularly designed for use with mating components 12 and 14 which do not have counterbores or recesses for seals 22. Of course, it will be apparent to those skilled in the art that sealing assembly 10 can be used with mating components with counterbores or recesses for seals 22 by reducing the thickness of seal retainer 20.

Sealing assembly 10 will only be described and illustrated with a diagrammatic illustration of mating members or components 12 and 14, since it will be readily apparent to those skilled in the art from this disclosure that the precise construction of the seal retainer 20, the number and locations of seals 22 will depend upon the particular application, as well as the particular structure of components 12 and 14.

Sealing assembly 10 is especially useful in the semiconductor process equipment and vacuum equipment industries or any other industries where high reliability and extremely tight sealing is required. In particular, sealing assembly 10 is preferably designed to provide a highly reliable seal. For example, sealing assembly 10 is preferably designed to pass a pressure test on the order of magnitude of $10^{-9}$ cc/sec helium.

In the example illustrated in FIGS. 1 and 2, component 12 is releasably coupled to component 14 via four bolts or fasteners 24 in a conventional manner. Of course, more or less bolts can be utilized depending upon the application. Component 12 can be, for example, a valve or regulator, while component 14 can be, for example, a manifold or base member. More specifically, component 12 has four bores 26 for slideably receiving fasteners 24 therethrough, while component 14 has four threaded bores 28 for threadedly receiving fasteners 24 therein, such that component 12 is releasably coupled to component 14 via fasteners 24.

Component 12 also preferably includes a pair of orifices 30 which align with orifices 32 of component 14 when components 12 and 14 are coupled together. It will be apparent to those skilled in the art from this disclosure that orifices 30 and 32 of components 12 and 14 can include counterbores which are sized to receive a portion of seals 22 therein. However, the overall depths of such counterbores would have to be smaller than the longitudinal or axial dimension of each of the seals 22 minus the thickness of seal retainer 20 such that the faces of such counterbores engage a portion of seals 22 to compress seals 22 therebetween, when components 12 and 14 are coupled together.

Seals 22 are preferably conventional ring seals having a C-shaped cross section with a bight portion 50 and a pair of curved leg portions 52. Of course, other types of annular seals could be used with other types of cross-sections. Moreover, seals 22 do not necessarily need to be round. Rather, seal retainer 20 can be modified to accommodate a wide variety of non-circular shapes. Bight portion 50 and leg portions 52 form an outwardly facing cavity or continuous groove 54. Each of the leg portions 52 of seals 22 has an annular sealing surface for engaging either face 36 of component 12 or face 38 of component 14.

Preferably, seals 22 are metallic seals which are constructed of suitable materials such as stainless steel or INCONEL 718. Ring seals such as ring seals 22 are well known in the art, and thus, ring seals 22 will not be discussed or illustrated in detail herein. Rather, seals 22 will only be discussed and illustrated as necessary to understand the present invention. In the illustrated embodiment, seals 22 have an outer diameter of approximately 0.271 inch and an axial dimension of approximately 0.062 inch.

Seal retainer 20 basically includes an inner layer 56 and a pair of outer plates 58 coupled to inner layer 56 via spot welding (three spot welds 59 are shown). Inner layer 56 has a body portion 60 with a seal receiving aperture 62 formed therein and a plurality of retaining elements or spring arms 64 extending inwardly from body portion 60 into seal receiving aperture 62. Body portion 60 is also provided with four mounting holes 66 for receiving fasteners 24 therethrough and three clearance holes 68 (only shown in FIG. 9) for allowing outer plates 58 to be spot welded together.

Preferably, outer plates 58 are spot welded together in one or more locations centered over clearance holes 68 of inner layer 56. As seen in FIG. 9, clearance holes 68 are designed to allow sufficient clearance so that the thicker outer plates 58 are deflected inwardly together to close the 0.003 to 0.005 inch gap, i.e., the thickness of inner layer 56, during spot welding. Clearance holes 68 have diameters which are small enough to engage the spot welds to prevent any movement of inner layer 56 relative to outer plates 58. In other words, clearance holes 68 are sized just large enough for spot weld to interconnect outer plates 58 together and to avoid creating a raised area. If clearance holes 68 or the like were not provided, spot welding of the three layers would most likely result in raised areas where the heat distorted and the molten metal flowed outwardly from the spot welding tips. These raised areas would most likely compromise the clamping and sealing of mating components 12 and 14 through decreasing the compression of the seal 22, and the raised areas would be driven into faces 36 and 38 of components 12 and 14 resulting in permanent damage to those surfaces.

Inner layer 56 and outer plates 58 are preferably constructed of metallic material such as stainless steel. Of course, other suitable non-metallic materials, metals or alloys can be used for inner layer 56 and outer plates 58 to form seal retainer 20. Inner layer 56 preferably is a substantially flat planar member which lies in a single plane and has a thickness of approximately 0.003 inch to approximately 0.005 inch. In particular, inner layer 56 is a very thin piece of resilient material with sufficient flexibility to be bent to receive seals 22 as discussed below. Outer plates 58, on the other hand, have a thickness of approximately 0.020 inch to approximately 0.025 inch. Accordingly, seal retainer 20 is quite thin compared to outer plates 58 and the axial or longitudinal dimension of seals 22. When outer plates 58 are coupled together and to inner layer 56, a substantially rigid retainer plate is formed in the area of these three layers.

Retaining elements 64 are integrally formed with body portion 60 as a one piece, unitary member, i.e., inner layer 56 is constructed of a single piece of material. Retaining elements 64 preferably have the same thickness as body portion 60 and at least initially lie in the same plane as body portion 60. Preferably, inner layer 56 is stamped to form seal receiving apertures 62, retaining elements 64 and mounting holes 66 utilizing conventional metal stamping techniques. Alternatively, inner layer 56 can be formed by electro discharge machining or other conventional manufacturing techniques.

In this embodiment, seal retainer 20 is designed for coupling a pair of seals 22 thereto. Of course, seal retainer 20 can be constructed to accommodate more or less seals as needed and/or desired. In the illustrated embodiment, seals 22 are coupled to body portion 60 by providing a single seal receiving aperture 62 in body portion 60 with the free ends of retaining elements 64 being arranged so that a first set of free ends of retaining elements 64 lie at points on a first circle for coupling a first seal 22 thereto and a second set of free ends of retaining elements 64 lie at points on a second circle for retaining a second seal 22 thereto.

Also, in this embodiment, a pair of the retaining elements 64 have a Y-shaped configuration such that its free end engages both of the seals 22. Of course, it will apparent to those skilled in the art from this disclosure that a pair of seal receiving apertures 62 could be utilized such that two different sets of retaining elements 64 are utilized to secure seals 22 to body portion 60.

Due to the resiliency of the sheet material used to construct seal retainer 20, retaining elements 64 are flexible resilient elements which can be bent out of the plane of body portion 60 for securing seals 22 thereto. In particular, seals 22 can be installed into seal receiving aperture 62 by angling the open side of seals 22 into the spring or resilient retaining elements 64 on one side and pushing the seals 22 past the opposing retaining elements 64 to allow them to spring into the open side of the C-section on the opposite side.

Alternatively, seals 22 can be installed into seal receiving aperture 62 by bending body portion 60 until the retaining elements 64 open sufficiently to allow the seals 22 to be inserted between the open free ends of retaining elements 64 and then reducing the bending of body portion 60 until the retaining elements 64 capture seal 22 by engaging cavity or groove 54 of seals 22.

While four retaining elements 64 are utilized to engage and retain each of the seals 22 to body portion 60, it will be apparent to those skilled in the art that a greater number of retaining elements 64 could be utilized, as well as fewer retaining elements 64 for securing seals 22 to body portion 60. Typically, three or four retaining elements 64 should be utilized for holding each of the seals 22 within seal receiving aperture 62.

Retaining elements 64 should be constructed such that their free ends are cantilevered relative to body portion 60 to allow independent deflection of each retaining element 64 relative to the other retaining element 64 for installation of seals 22 therein.

Moreover, it will be apparent to those skilled in the art from this disclosure that if more than one seal 22 is to be installed in the body portion 60 of seal retainer 20, that the number of spring arms or retaining elements 64 would be increased. Also it will be apparent to those skilled in the art that when seals 22 are closely spaced together, seals 22 may have one or more common retaining elements 64 supporting them to accommodate the additional seals more efficiently as shown.

Moreover, it will be apparent to those skilled in the art from this disclosure that retaining elements 64 can have a wide variety of shapes for retaining seals 22 within seal receiving aperture 62. In any event, the important concept is that the retaining elements 64 engage the structure of seals 22 without interfering with the compression of seals 22 and that the retaining elements have some resiliency to allow installation of seals 22 into retainer 20 and any required movement of the seals 22 into the counterbore(s) of the mating components.

Regarding mounting holes 66, one or more of the mounting holes 66 is preferably configured to provide retention on the fastener or mounting bolts 24 after the fasteners 24 have been passed through bores 26 of component 12 which is to be coupled and sealed to the mating component 14. One possible configuration of mounting holes 66 is shown in the figures. In the illustrated embodiment, all four of the mounting holes 66 are D-shaped to threadedly receive fasteners 24. In particular, the flat side of the "D" of each mounting hole 66 is dimensioned such that the clearance between the flat side and the radiused portion is less than the minimum outside diameter of fasteners 24 and greater than the largest possible thread root diameter of fasteners 24. This provides a fit such that fasteners 24 may be threaded through mounting holes 66 of seal retainer 20, but seal retainer 20 will not freely slide over fasteners 24.

It should be apparent to those skilled in the art from this disclosure that a wide variety of protrusion shapes into one or more of the mounting holes 66 can be used to create the same effect. For example, other shapes of mounting holes 66 would be a semi-circular shape(s), square or rectangular tabs, etc. intruding into the hole. Moreover, not all of the mounting holes need to be configured to be retained on fasteners 24.

Outer plates 58 are preferably substantially identical to each other, but rotated 90° relative to each other when welded or otherwise secured to inner layer 56. Outer plates 58 are preferably substantially flat planar members which have a thickness of approximately 0.020 to approximately 0.025 inch. Accordingly, the effective thickness of seal retainer 20 of the illustrated example is approximately 0.043 inch to approximately 0.055 inch. In any event, it is important that the overall thickness of seal retainer 20 is less than the axial dimension of seals 22 so that leg portions 52 are compressed the correct amount, when components 12 and 14 are coupled together. It will be apparent to those skilled in the art that by varying the thicknesses of outer plates 58, the amount of compression occurring in seals 22 can also be varied.

Each of the outer plates 58 has a cutout 70, which overlies seal receiving aperture 62, and four bolt clearance holes 72, which overlie mounting holes 66 of body portion 60. Cutouts 70 are spaced from retaining elements 64 so that seals 22 can be installed after outer plates 58 are welded to inner layer 56. In other words, cutouts 70 are sized to allow retaining elements 64 to be bent to install seals 22 within seal receiving aperture 62. This allows seal retainer 20 to be constructed outside of a clean room or clean environment, and then subsequently cleaned and seals 22 installed therein.

Moreover, cutouts 70 extend to the edges of outer plates 58. Thus, cutouts 70 act as direct ports to the perimeters of outer plates 58 for detecting a leak in two different directions. This will allow leak detection to be efficiently conducted regardless of the installation position of seal retainer 20 in relation to other components adjacent to components 12 and 14.

Outer plates 58 have sufficient clearance about the locations of seals 22 so that seals 22 can be installed in inner layer 56 after outer plates 58 have been welded together. In other words, retaining elements 64 are not constrained by outer plates 58.

To aid in assembly of seal retainer 20, a notch 74 is provided in each of the outer plates 58. Notches 74 ensure proper orientation of outer plates 58 relative to inner layer 56. In the illustrated embodiment, notches 74 are aligned with cutout 70 of the other outer plate 58 where cutout 70 meets the perimeter of seal retainer 20.

Installation of Sealing Assembly 10

As mentioned above, seals 22 are coupled to seal retainer 20 to properly locate seals 22 with respect to orifices 30 and 32 of components 12 and 14. This arrangement allows seal assembly 10 to be installed between components 12 and 14 without contact by hands or tools which could contaminate or damage seals 22.

Seals 22 are installed within seal receiving aperture 62 of body portion 60 via retaining elements 64. In particular, retaining elements 64 can be deflected out of the plane of body portion 60 so that the free ends of retaining elements 64 are received in the annular cavity or groove 54 of each of the seals 22 for retaining seals 22 to body portion 60. As mentioned above, this can be done by angling one side of seals 22 such that two of the spring arms or retaining elements 64 engage annular cavity or groove 54 of seals 22 and then pushing seals 22 past the opposing two arms or retaining elements 64 to allow them to spring into the other side of cavity or groove 54 of seals 22 to capture seals 22 therebetween.

Alternatively, seals 22 can be installed into seal receiving aperture 62 by bending body portion 60 of seal retainer 20 until the free ends of spring arms or retaining elements 64 open sufficiently to allow seals 22 to be inserted between the free ends of retaining elements 64, and then reducing the bending of body portion 60 such that the retaining elements 64 return to the plane of body portion 60 to capture seals 22 via the free ends of retaining elements 64 engaging the annular cavity or groove 54 of seals 22.

Once the sealing assembly 10 is complete, sealing assembly 10 is then coupled to one of the components 12 or 14. In this particular embodiment, sealing assembly 10 is retained to component 12 via fasteners 24. In particular, fasteners 24 are inserted through bores 26 of component 12 and then threaded into the four D-shaped mounting holes 66 for retaining sealing assembly 10 thereto. In this position, seals 22 are correctly located since mounting holes 66 not only retain sealing assembly 10 to component 12 but also ensure proper location of seals 22 relative to orifices 30 and 32 of components 12 and 14, respectively.

Next, components 12 and 14 are coupled together by fasteners 24. In particular, fasteners 24 are now threaded into threaded bores 28 of component 14. When fasteners 24 are tightened down, the annular sealing surfaces of leg portions 52 of seals 22 will engage face 36 of component 14 and face 38 of component 12 to create a seal therebetween. Moreover, seals 22 are compressed to ensure a fluid tight seal between components 12 and 14 about orifices 30 and 32. Accordingly, the dimensions and proportions of spring arms or retaining elements 64, including their length, width, tip design and the overall thickness of seal retainer 20, are determined by the size of the seals and the available area under the mating components to be sealed. The overall concept can be applied to any number of seals, bolt patterns with any number of bolts and/or obvious variations.

Sealing assembly 10 is especially applicable to the semiconductor process and vacuum equipment industries, as well as other industries where high reliability and extremely tight sealing is required, e.g., a seal which passes a leakage test of $10^{-9}$ cc/sec helium. The sealing assembly 10 is also applicable for sealing location and retention whenever an externally pressurize seal configuration is suitable.

Other variations and/or modifications of the present invention includes retaining multiple seals of various numbers and arrangements, as well as accommodating various numbers and arrangements of fasteners. Moreover, the various thicknesses and types of sheet materials can be utilized to construct seal retainer 20 in accordance with the present invention. Moreover, while circular ring seals 22 are illustrated, it will be apparent to those skilled in the art that non-circular configurations for seals 22 could also be utilized with minor modifications to the arrangement and orientation of retaining elements 64.

While only one embodiment has been chosen to illustrate the present invention, it will be understood by those skilled in the art from this disclosure that various changes and modifications can be made therein without departing from the scope of the invention as defined in the appended claims.

What is claimed is:

1. A seal retainer for coupling at least one seal thereto, comprising:

a substantially flat inner layer lying in a first plane with a first thickness, said inner layer including at least one seal receiving aperture, and at least one resilient retaining element integrally formed with said inner layer as a one-piece, unitary member, said at least one retaining element extending inwardly from said inner layer into said at least one seal receiving aperture to a free end, said at least one retaining element being resiliently cantilevered relative to said first inner layer to permit said free end of said at least one retaining element to be resiliently deflected out of said plane of said first inner layer to engage a cavity in the seal; and a first outer plate with a second thickness fixedly coupled to and overlying a portion of a first side of said inner layer to increase overall thickness of said seal retainer.

2. A seal retainer according to claim 1, wherein at least one of said inner layer and said first outer plate includes at least one mounting hole spaced from said at least one seal receiving aperture.

3. A seal retainer according to claim 2, wherein said at least one mounting hole is shaped and sized for engaging a mounting member to retain said seal retainer thereon.

4. A seal retainer according to claim 1, wherein said inner layer and said first outer plate are constructed of a metallic material.

5. A seal retainer according to claim 1, wherein said first outer plate is thicker than said inner layer.

6. A seal retainer according to claim 1, wherein said inner layer has a plurality of said retaining elements with free ends adapted to engage at least one seal.

7. A seal retainer according to claim 6, wherein a first set of said free ends of said retaining elements lie at points on a first circle in said first plane of said inner layer.

8. A seal retainer according to claim 7, wherein a second set of said free ends of said retaining elements lie at points on a second circle in said first plane of said inner layer.

9. A seal retainer according to claim 6, wherein said retaining elements are resiliently cantilevered relative to said body portion to permit a seal coupled thereto to be deflected out of said plane of said body portion.

10. A seal retainer according to claim 1, further comprising a second outer plate with a third thickness fixedly coupled to and overlying a portion of a second side of said inner layer to further increase overall thickness of said seal retainer.

11. A seal retainer according to claim 10, wherein said second and third thicknesses of said outer plates are substantially equal and thicker than said first thickness of said inner layer.

12. A seal retainer according to claim 10, wherein said inner layer includes locating and retaining means for coupling said body portion in a desired location.

13. A seal retainer according to claim 12, wherein said at least one mounting hole is shaped and sized for engaging a mounting member to retain said inner layer thereon.

14. A seal retainer according to claim 10, wherein said first and second outer plates are substantially identical except for being arranged substantially 90° relative to each other.

15. A seal retainer according to claim 10, wherein each of said first and second outer plates has a cutout surrounding said at least one seal receiving aperture.

16. A seal retainer for coupling at least one seal thereto, comprising:

a substantially flat inner layer lying in a first plane with a first thickness, said inner layer including at least one seal receiving aperture, and at least one resilient retaining element integrally formed with said inner layer as a one-piece, unitary member, said at least one retaining element extending inwardly from said inner layer into said at least one seal receiving aperture to a free end; and a first outer plate with a second thickness fixedly coupled to and overlying a portion of a first side of said inner layer to increase overall thickness of said seal retainer, said inner layer being constructed of a thin material having a thickness ranging from approximately 0.003 inch to approximately 0.005 inch.

17. A seal retainer according to claim 16, wherein said first outer plate has a thickness ranging from approximately 0.020 inch to approximately 0.025 inch.

18. A seal retainer for coupling at least one seal thereto, comprising:

a substantially flat inner layer lying in a first plane with a first thickness, said inner layer including at least one seal receiving aperture, and a plurality of resilient retaining elements integrally formed with said inner layer as a one-piece, unitary member, each of said retaining elements extending inwardly from said inner layer into said at least one seal receiving aperture to a free end adapted to engage the at least one seal; and a first outer plate with a second thickness fixedly coupled to and overlying a portion of a first side of said inner layer to increase overall thickness of said seal retainer, said retaining elements being arranged for supporting at least two separate seals.

19. A seal retainer according to claim 18, wherein at least some of said retaining elements are arranged to engage at least two seals.

20. A seal retainer for coupling at least one seal thereto, comprising:

a substantially flat inner layer lying in a first plane with a first thickness, said inner layer including at least one seal receiving aperture, and at least one resilient retaining element integrally formed with said inner layer as a one-piece, unitary member, said at least one retaining element extending inwardly from said inner layer into said at least one seal receiving aperture to a free end;

a first outer plate with a second thickness fixedly coupled to and overlying a portion of a first side of said inner layer to increase overall thickness of said seal retainer; and a second outer plate with a third thickness fixedly coupled to and overlying a portion of a second side of said inner layer to further increase overall thickness of said seal retainer, each of said first and second outer plates having a cutout surrounding said at least one seal receiving aperture, each of said cutouts having a port extending to a peripheral edge of its respective said first and second outer plates.

21. A seal retainer according to claim 20, wherein said ports being arranged substantially 90° relative to each other.

22. A seal retainer according to claim 21, wherein said first and second outer plates including means for orienting said first and second plates relative to each other.

23. A sealing assembly for creating a seal between first and second components, comprising:

at least one annular seal with first and second longitudinally facing sealing surfaces and an outwardly facing cavity located between said first and second longitudinally facing sealing surfaces; and a seal retainer having a substantially flat inner layer lying in a first plane with a first thickness, and a first outer plate with a second thickness fixedly coupled to and overlying a portion of a first side of said inner layer, said inner layer including at least one seal receiving aperture, and at least one resilient retaining element integrally formed with said inner layer for engaging said cavity of said at least one seal to retain said at least one seal thereto, said at least one retaining element being resiliently cantilevered relative to said first inner layer to permit said free end of said at least one retaining element to be resiliently deflected out of said plane of said first inner layer to engage said cavity in said at least one seal.

24. A sealing assembly according to claim 23, wherein said cavity is a continuous, annular groove.

25. A sealing assembly according to claim 24, wherein said at least one seal is a circular ring seal.

26. A sealing assembly according to claim 23, wherein a second outer plate with a third thickness fixedly coupled to and overlying a portion of a second side of said inner layer to further increase overall thickness of said seal retainer.

27. A sealing assembly according to claim 23, wherein said inner layer has a plurality of said retaining elements with free ends adapted to engage said at least one seal.

28. A sealing assembly according to claim 26, wherein at least one of said inner layer and said outer plates includes at least one mounting hole spaced from said at least one seal receiving aperture.

29. A sealing assembly according to claim 28, wherein said at least one mounting hole is shaped and sized for engaging a mounting member to retain said body portion thereon.

30. A sealing assembly according to claim 27, wherein a first set of said free ends of said retaining elements lie at points on a first circle in said first plane of said inner layer.

31. A sealing assembly according to claim 27, wherein said retaining elements are resiliently cantilevered relative to said inner layer to permit a seal coupled thereto to be deflected out of said first plane of said inner layer.

32. A sealing assembly according to claim 26, wherein said first and second outer plates are substantially identical except for being arranged substantially 90° relative to each other.

33. A sealing assembly according to claim 26, wherein each of said first and second outer plates has a cutout surrounding said at least one seal receiving aperture.

34. A sealing assembly for creating a seal between first and second components, comprising:

at least one annular seal with first and second longitudinally facing sealing surfaces and an outwardly facing cavity located between said first and second longitudinally facing sealing surfaces; and a seal retainer having a substantially flat inner layer lying in a first plane with a first thickness, a first outer plate with a second thickness fixedly coupled to and overlying a portion of a first side of said inner layer, and a second outer plate with a third thickness fixedly coupled to and overlying a portion of a second side of said inner layer to further increase overall thickness of said seal retainer, said inner layer including at least one seal receiving aperture, and at least one resilient retaining element integrally formed with said inner layer for engaging said cavity of said at least one seal to retain said at least one seal thereto, said inner layer being constructed of a thin material having a thickness ranging from approximately 0.003 inch to approximately 0.005 inch.

35. A sealing assembly according to claim 34, wherein said first outer plate is thicker than said inner layer.

36. A sealing assembly according to claim 34, wherein said second and third thicknesses of said outer plates are substantially equal and thicker than said first thickness of said inner layer.

37. A sealing assembly for creating a seal between first and second components, comprising:

at least one annular seal with first and second longitudinally facing sealing surfaces and an outwardly facing cavity located between said first and second longitudinally facing sealing surfaces; and a seal retainer having a substantially flat inner layer lying in a first plane with a first thickness, a first outer plate with a second thickness fixedly coupled to and overlying a portion of a first side of said inner layer, and a second outer plate with a third thickness fixedly coupled to and overlying a portion of a second side of said inner layer to further increase overall thickness of said seal retainer, said inner layer including at least one seal receiving aperture, and at least one resilient retaining element integrally formed with said inner layer for engaging said cavity of said at least one seal to retain said at least one seal thereto, each of said first and second outer plates having a cutout surrounding said at least one seal receiving aperture, each of said cutouts having a port extending to a peripheral edge of its respective said first and second outer plates.

38. A sealing assembly according to claim 37, wherein said ports being arranged substantially 90° relative to each other.

39. A sealing assembly according to claim 38, wherein said first and second outer plates including means for orienting said first and second plates relative to each other.

* * * * *